United States Patent [19]

Keszler

[11] Patent Number: 5,684,813
[45] Date of Patent: Nov. 4, 1997

[54] POLYBORATES USEFUL FOR OPTICAL FREQUENCY CONVERSION

[75] Inventor: Douglas A. Keszler, Corvallis, Oreg.

[73] Assignee: The State of Oregon Acting By and Through the Oregon State Board of Higher Education on Behalf of Oregon State University, Corvallis, Oreg.

[21] Appl. No.: 548,458

[22] Filed: Oct. 26, 1995

[51] Int. Cl.$^6$ ........................................... H01S 3/10
[52] U.S. Cl. ........................... 372/21; 372/22; 117/13; 359/328; 359/330
[58] Field of Search .......................... 372/21, 22, 39, 372/41; 359/328, 330; 117/13

[56] References Cited

U.S. PATENT DOCUMENTS

| | | | |
|---|---|---|---|
| 3,934,154 | 1/1976 | Cook, Jr. | 359/328 |
| 5,144,630 | 9/1992 | Lin | 372/21 |
| 5,191,587 | 3/1993 | Hanson et al. | 372/21 |
| 5,381,754 | 1/1995 | Wu et al. | 372/21 |
| 5,390,211 | 2/1995 | Clark et al. | 372/21 |

OTHER PUBLICATIONS

"New Nonlinear Optical Crystal: Cesium Lithium Borate," Yusuke Mori, et al., Appl. Phys. Lett. 67(13), Sep. 25, 1995, pp. 1818–1820.

"Caesium Lithium Borate: A New Nonlinear Optical Crystal," Takatomo Sasaki, et al., Acta Crystallographica, Section C, 1995, pp. 2222–2224.

"New Nonlinear Optical Crystal Cesium Lithium Borate," Proceeding of Advanced Solid–State lasers Conference, Memphis, Tennessee, Jan. 30–Feb. 2, 1995 (Paper WD3), Sasaki, et al., 5 pp.

*Primary Examiner*—Leon Scott, Jr.
*Attorney, Agent, or Firm*—Klarquist Sparkman Campbell Leigh & Whinston, LLP

[57] ABSTRACT

Nonlinear optical materials are described which satisfy Formula 1

$$M_{X1}M'_Y(B_3O_5)_Z \qquad \text{Formula 1}$$

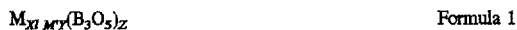

wherein M and M' are mono- or divalent metal ions, X varies from about 0.1 to about 1.9, Y varies from about 1.9 to about 0.1, and Z is 2 or 3. Currently, the best nonlinear optical materials also satisfy Formula 2

$$M_X M'_Y(B_3O_5)_{X+Y} \qquad \text{Formula 2}$$

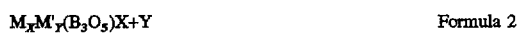

wherein M and M' are monovalent metal ions independently selected from the group consisting of Group IA metals, X varies from 0.1 to about 1.9, and wherein Y varies from about 1.9 to about 0.1. The best results are achieved when compounds satisfying Formula 2 have X=Y=1, and the metal ions are independently selected from the group consisting of lithium, sodium, potassium, rubidium, cesium and francium. One example, without limitation, of a compound that satisfies Formulas 1 and 2 is $CsLiB_6O_{10}$. The disclosure also describes compositions that include the described nonlinear optical materials, methods for making such nonlinear optical materials, and devices which include the nonlinear optical materials.

32 Claims, 2 Drawing Sheets

POLYBORATES USEFUL FOR OPTICAL FREQUENCY CONVERSION

ACKNOWLEDGMENT OF GOVERNMENT SUPPORT

This invention was developed with funds from the National Science Foundation, grant numbers DMR-8814432 and DMR-9221372. The United States Government may have rights to this invention.

FIELD OF THE INVENTION

This invention concerns nonlinear optical materials and devices employing such materials.

BACKGROUND OF THE INVENTION

Nonlinear optical (NLO) materials are unusual in that their optical properties are affected by light. For instance, light polarizes certain materials. If the polarization is linear, then light emitted by the material has the same frequency as the absorbed light. NLO materials are polarized in a non-linear manner. As a result, the frequency of the light emitted by a nonlinear optical material is some value times the frequency of the light incident on the material.

Laser technology is one field that has prompted the development of new NLO materials. Known NLO materials generally are suitable only for those applications for which they were particularly designed. As a result, new NLO materials continually must be developed having properties selected for a particular application.

Furthermore, most known NLO materials have incongruent melting points. This means that as the compounds melt, the solid compound cannot coexist with the liquid of the same composition. The practical result is that the solid-to-liquid phase transformation does not occur at a specific temperature for the entire material. Instead, the solid-to-liquid transformation occurs over a temperature range. This melting property makes it difficult to process known NLO materials on a commercial scale because a flux agent must be added to the pure material to enable the production of single crystals. This leads either to the inclusion of defects that limit the performance of the material, or requires very long crystal growth times.

Thus, new NLO materials having congruent melting points are particularly desirable. These material may be grown from a stoichiometric melt, thereby limiting defects and decreasing growth times. Moreover, with congruently melting materials it generally is possible to adjust the melt composition slightly off stoichiometry to further improve crystal-growth characteristics.

Boric crystals are a particular class of NLO materials having properties suitable for ultraviolet, nonlinear optic applications. Examples of known boric-crystal NLO materials include $LiB_3O_5$ and $\beta\text{-}BaB_2O_4$. These compounds are known to generate UV light by frequency mixing of Nd:YAG laser outputs. See Chin et al.'s *J. Opt. Soc. Am.*, 6:616 (1989), and Chin et al.'s *Sci. Sin.*, 579 (1984). Boric crystals also have been used in patented devices. For instance, Chuangtian et al.'s U.S. Pat. No. 4,863,283 describes an NLO device that uses a single crystal of $LiB_3O_5$.

In summary, known NLO compounds are limited to particular applications, and most suffer from one or more of the following undesirable properties: (1) incongruous melting; (2) excessive energy requirements for inducing NLO effects; (3) excessive material damage by exposure to high-powered lasers; (4) excessive absorption and light scattering of incident light; and (5) too costly and time consuming for commercial production. These and other deficiencies are discussed in *Chemistry of Materials*, 1:492–508 (1989).

SUMMARY OF THE INVENTION

The present invention concerns nonlinear optical materials according to Formula 1

$$M_xM'_Y(B_3O_5)_Z \qquad \text{Formula 1}$$

wherein M and M' are mono- or divalent metal ions, X varies from about 0.1 to about 1.9, Y varies from about 1.9 to about 0.1, and Z is 2 or 3. Mono- and divalent metal ions M and M' suitable for forming compounds satisfying Formula 1 can be independently selected from the group consisting of Group IA and IIA metals. The best results are achieved by independently selecting M and M' from the group consisting of cesium, lithium, barium, sodium and strontium. Examples of nonlinear optical materials satisfying Formula 1 include, without limitation, $CsLi(B_3O_5)_2$, $SrLi(B_3O_5)_3$, $BaNa(B_3O_5)_3$ and $BaLi(B_3O_5)_3$.

Best examples of currently known nonlinear optical compounds according to this invention also satisfy Formula 2

$$M_xM'_Y(B_3O_5)_{X+Y} \qquad \text{Formula 2}$$

wherein M and M' are monovalent metal ions independently selected from the group consisting of Group IA metals, X varies from 0.1 to about 1.9, and wherein Y varies from about 1.9 to about 0.1. The best results are achieved when compounds satisfying Formula 2 have X=Y=1. The monovalent metal ions generally are independently selected from the group consisting of lithium, sodium and cesium, and the best results are achieved using monovalent metal ions independently selected from the group consisting of lithium and cesium. One example, without limitation, of a compound that satisfies Formula 1 is $CsLi(B_3O_5)_2$.

The nonlinear optical materials of the present invention can be combined with other materials to form useful compositions, as long as the other materials do not unduly compromise the nonlinear optical features. For instance, the nonlinear optical materials may be mixed with inert materials to form composites which still exhibit nonlinear optical properties.

Methods for making nonlinear optical materials that satisfy both Formulas 1 and 2 also are described. One embodiment comprises forming a mixture comprising from about 10 to about 20 mole percent of a source of M, from about 10 to about 20 mole percent of a source of M', and from about 60 to about 80 mole percent of boron oxide. The mixture is heated to a temperature and for a period of time sufficient to form the NLO material. For instance, the step of heating may comprise heating the mixture to a first temperature of at least 825 K, and generally greater than about 850 K. The mixture is then cooled. The cooled mixture is comminuted (ground to a fine powder, such as by grinding with a mortar and pestle), and then heated to a second temperature of at least 900 K, generally greater than about 1000 K. If M is Cs, then the source of M generally is cesium carbonate. If M' is Li, then the source of M' generally is lithium nitrate.

The present invention also concerns devices which somehow use or require nonlinear optical materials for operation. An example, without limitation, of such a device is an optical parametric oscillator (OPO). An OPO uses NLO materials to produce widely tunable coherent light. Optical devices of the present invention comprise a light source, such as a laser, optically coupled to nonlinear optical materials that satisfy Formula 1, Formula 2 or both. Naturally, the device could include additional components, such as, without limitation, photodetectors, photomultipliers, crystal mounts, lens and/or mirror systems, cooling systems a control and/or data acquisition computer, etc.

DETAILED DESCRIPTION OF THE PREFERRED EMBODIMENTS

Figure 1:
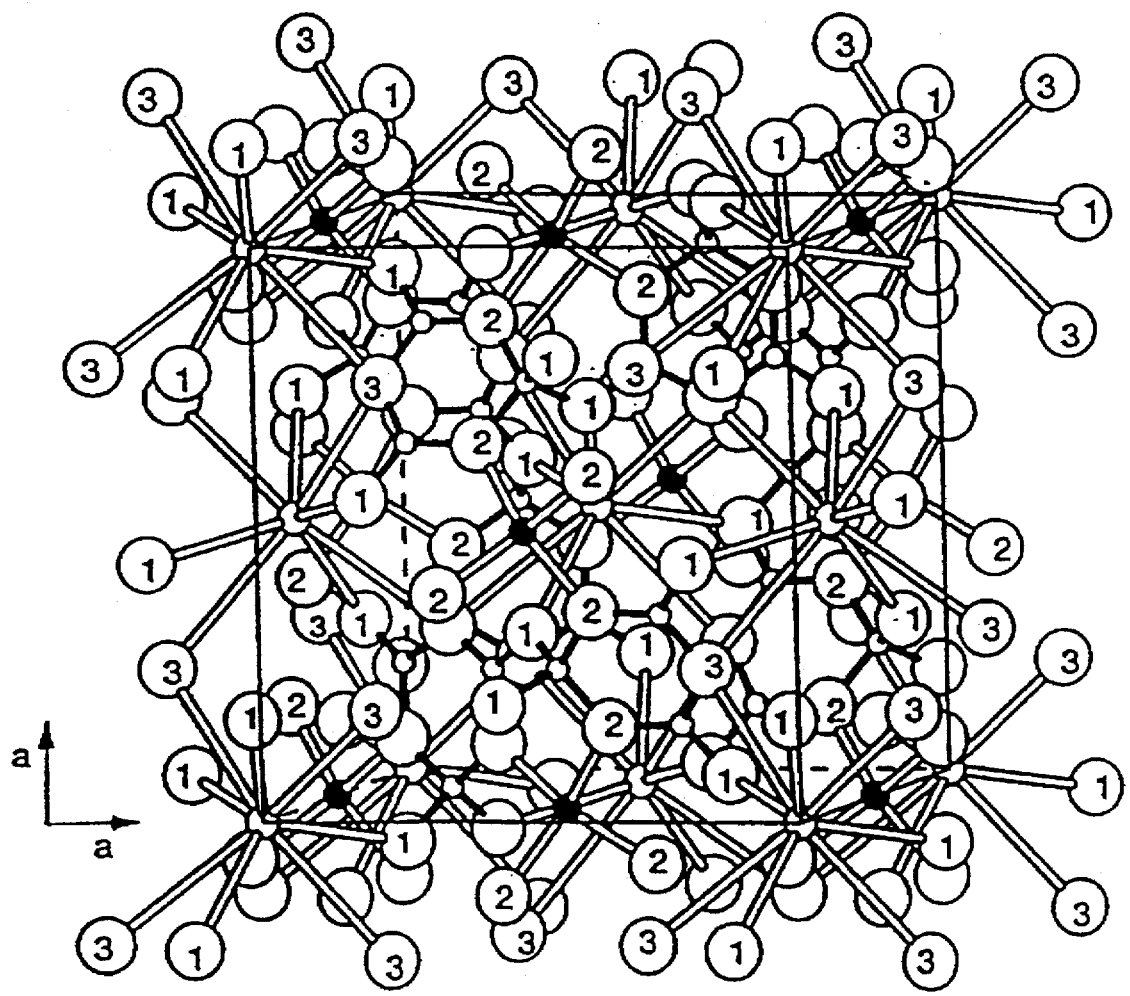
FIG. 1 is a schematic drawing of the crystal structure of an NLO material according to the present invention.

The present invention provides nonlinear optical materials that can be used for a number of optical applications. The following paragraphs describe the nonlinear optical materials, as well as how to make and use the compounds.

I. Description of NLO Materials

The nonlinear optical materials of the present invention are formed from mono- or divalent metal ions, with the best results being achieved using monovalent metal ions. The nonlinear optical materials have a complex borate framework, with the B:O ratio of the framework being about 3:5.

The present NLO materials generally satisfy Formula 1

$$M_X M'_Y (B_3 O_5)_Z \qquad \text{Formula 1}$$

wherein M and M' are positively charged metal atoms. M and M' of Formula 1 are independently selected from the Group 1A and 2A metals, namely lithium, sodium, potassium, rubidium, cesium, francium, beryllium, magnesium, calcium, strontium, barium and radium. For compounds satisfying Formula 1, the best results are achieved when M and M' are independently selected from the group consisting of cesium, lithium, barium, sodium and strontium. Even better results are achieved if M and M' are independently selected from the group consisting of cesium and lithium. Other charged species which charge balance the $B_3O_5$ species also may be used to form compounds satisfying Formula 1, as long as these compounds also exhibit NLO properties. The value of X varies from about 0.1 to about 1.9, and the value of Y varies from about 1.9 to about 0.1. The best results are achieved when the values of X and Y are about 1. The value of Z generally is 2 or 3. Examples, without limitation, of compounds that satisfy Formula 1 include: $CsLi(B_3O_5)_2$, wherein X=1, Y=1, and Z=2; and $SrLi(B_3O_5)_3$, $BaNa(B_3O_5)_3$ and $BaLi(B_3O_5)_3$, wherein X=1, Y=1, and Z=3. Each of these compounds exhibits NLO characteristics.

Currently, the best working compounds according to the present invention satisfy Formula 2

$$M_X M'_Y (B_3 O_5)_{X+Y} \qquad \text{Formula 2}$$

wherein M and M' are positively charged monovalent metal atoms. For compounds satisfying Formula 2, the best results are achieved when M and M' are independently selected from the Group 1A metals, namely lithium, sodium, potassium, rubidium, cesium and francium. Even better results are achieved when M and M' are independently selected from the group consisting of cesium and lithium. Other charged species which charge balance the $B_3O_5$ species also can be used to form compounds satisfying Formula 2, as long as these compounds also exhibit NLO properties. The value of X varies from about 0.1 to about 1.9, and Y varies from about 1.9 to about 0.1. The best results are obtained when the values of X and Y are about 1, so that X+Y=2.

By way of example and without limitation, one compound that satisfies general Formula 2 and which exhibits NLO properties is $CsLiB_6O_{10}$. This specific nonlinear optical material can be represented as Formula 3.

$$Cs_{X=1} Li_{Y=1} (B_3 O_5)_{1+1} \qquad \text{Formula 3}$$

"M" and "M'" of Formula 2 are Cs and Li, respectively, in Formula 3. In this particular example, X=1 and Y=1, so that the sum of X and Y is 2. Formula 3 is simplified by multiplying $B_3O_5$ by 2 [2×3 and 2×5], which provides $CsLiB_6O_{10}$.

II. General Method for Making NLO Materials

A number of methods, now known or hereinafter developed, can be used to synthesize compounds that satisfy Formulas 1 and 2. In general, and without limitation, compounds satisfying both Formulas 1 and 2 have been synthesized by heating appropriate molar amounts of starting materials to a temperature sufficient to form the nonlinear optical materials. First, a mixture was formed comprising appropriate molar amounts of a source of M, a source of M', and boron oxide. The mixture was then heated a to a first temperature that generally was greater than about 850 K. The mixture was then cooled to room temperature and ground using a mortar and pestle. The ground material was heated a second time to a second temperature higher than the first temperature, such as to a temperature of greater than about 950 K. This second heating step continued for a period of time sufficient to form a single-phase product.

Crystals were grown from a stoichiometric melt once the desired compounds were obtained by the general method outlined above. To grow the crystals, the compounds were heated to a temperature above the melting point, and then slowly cooled at a rate of about 5–10 K/hour to a first temperature of about 8–900 K. The material was then cooled to room temperature at a faster cooling rate, such as about 60 K/hr. Transparent crystals of nonlinear optical materials satisfying Formulas 1 and 2 were obtained by this process.

III. Working Examples

The following examples describe particular embodiments of the present invention. These examples should be interpreted as being exemplary of the invention only, and not to limit the invention to the specific features discussed therein. Examples 1–4 describe particular processes used to synthesis compounds satisfying Formulas 1 and 2. Example 5 demonstrates that materials satisfying Formulas 1 and 2 exhibit nonlinear optical properties.

EXAMPLE 1

This example describes the synthesis of $CsLi(B_3O_5)_2$. Cesium carbonate ($Cs_2CO_3$), having a purity of greater than 99.9 percent, reagent-grade lithium nitrate ($LiNO_3$), and $B_2O_3$, 99.98 percent pure, were obtained from commercial vendors, such as Alpha Chemicals and Aesar. A mixture was first formed comprising about 11 mole percent cesium carbonate, about 67 mole percent lithium nitrate and about 22 mole percent boron oxide. This mixture was placed in a crucible and heated at 893 K for about one hour. The mixture was then cooled to room temperature and ground using a mortar and pestle. The ground material was heated a second time at 970 K for eight hours to form a single-phase product.

Crystals of this product were then grown from a stoichiometric melt. The melt was cooled in a platinum crucible from an initial temperature of 1160 K to a final temperature of 893 K at a cooling rate of about 6 K/hr. This melt was then cooled to room temperature at a cooling rate of about 60 K/hr. Colorless, transparent crystals of $CsLiB_6O_{10}$ were obtained.

A crystal (0.2×0.1×0.1 millimeters) was selected for structure determination and mounted on a glass fiber with epoxy. All crystal measurements were made with graphite-monochromated Mo K$\alpha$ radiation on a Ragaku AFC 6R diffractometer. The crystal structure was solved and refined using programs from TEXSAN™ crystal graphic software. All calculations for solving the structure were performed on a digital µ-VAXII computer. The data collected from the structure determination indicated that the crystal forms a non-centrosymmetric 42 D space group. A crystal structure for the compound produced according to Example 1 is shown in FIG. 1.

EXAMPLE 2

This example describes the synthesis of $SrLi(B_3O_5)_3$. Strontium nitrate [$Sr(NO_3)_2$], having a purity of greater than 99 percent, reagent-grade lithium nitrate ($LiNO_3$), and $B_2O_3$, 99.98 percent pure, were obtained from commercial vendors. A mixture was first formed comprising about 11 mole percent cesium carbonate, about 22 mole percent lithium nitrate and about 67 mole percent boron oxide. This mixture was placed in a crucible and heated at 893 K for about one hour. The mixture was then cooled to room temperature and ground using a mortar and pestle. The ground material was heated a second time at 1023 K for twelve hours to form a single-phase product.

Crystals of this product were then grown from a stoichiometric melt as described above in Example 1 to produce colorless, transparent crystals of $SrLi(B_3O_5)_3$.

EXAMPLE 3

This example describes the synthesis of $BaLi(B_3O_5)_3$. Barium carbonate [$BaCO_3$], having a purity of greater than 98 percent, reagent-grade lithium nitrate ($LiNO_3$), and $B_2O_3$, 99.98 percent pure, were obtained from commercial vendors. A mixture was first formed comprising about 15 mole percent barium carbonate, about 15 mole percent lithium nitrate and about 70 mole percent boron oxide. This mixture was placed in a crucible and heated at 893 K for about one hour. The mixture was then cooled to room temperature and ground using a mortar and pestle. The ground material was heated a second time at 1073 K for twelve hours to form a single-phase product.

Crystals of this product were then grown from a stoichiometric melt as described above in Example 1 to produce colorless, transparent crystals of $BaLi(B_3O_5)_3$.

EXAMPLE 4

This example describes the synthesis of $BaNa(B_3O_5)_3$. Barium carbonate [$BaCO_3$], having a purity of greater than 98 percent, reagent-grade sodium nitrate ($NaNO_3$), and $B_2O_3$, 99.98 percent pure, were obtained from commercial vendors. A mixture was first formed comprising about 15 mole percent barium carbonate, about 15 mole percent lithium nitrate and about 70 mole percent boron oxide. This mixture was placed in a crucible and heated at 893 K for about one hour. The mixture was then cooled to room temperature and ground using a mortar and pestle. The ground material was heated a second time at 1073 K for twelve hours to form a single-phase product.

Crystals of this product were then grown from a melt having a composition of 1 $BaO:0.5Na_2O:6.05B_2O_3$ as described above in Example 1 to produce colorless, transparent crystals of $BaNa(B_3O_5)_3$.

The NLO materials of the present invention also can be combined with other materials to form compositions that are useful for a variety of purposes. For instance, such materials likely will be used in various electronic and laser applications. As a result, materials commonly used in these fields, such as inert fillers, may be combined with the NLO materials described herein, as long as such materials do not adversely alter the desired NLO properties.

EXAMPLE 5

This example describes how the nonlinear optical materials of the present invention can be used to generate second harmonic light energy. A Nd:YAG laser was used as a light source to generate 1064-nm light. This light was filtered and passed through a sample of NLO material made according to Example 1 and mounted on a silica glass plate. Second harmonic light energy emerged from the crystal and was directed onto a. photomultiplier tube to a dichroic mirror. The light energy was thereafter monitored with a Tektronix oscilloscope. Micro-crystalline KDP served as the standard.

Data generated by practicing the steps stated in Example 5 shows that materials satisfying Formulas 1 and 2 function as nonlinear optical materials. More specifically, second harmonic light energy emerging from materials made according to the present invention had intensities greater than KDP, which was used as a standard. $CsLi(B_3O_5)_2$ has an intensity, relative to KDP, of about 1.6.

Figure 2:
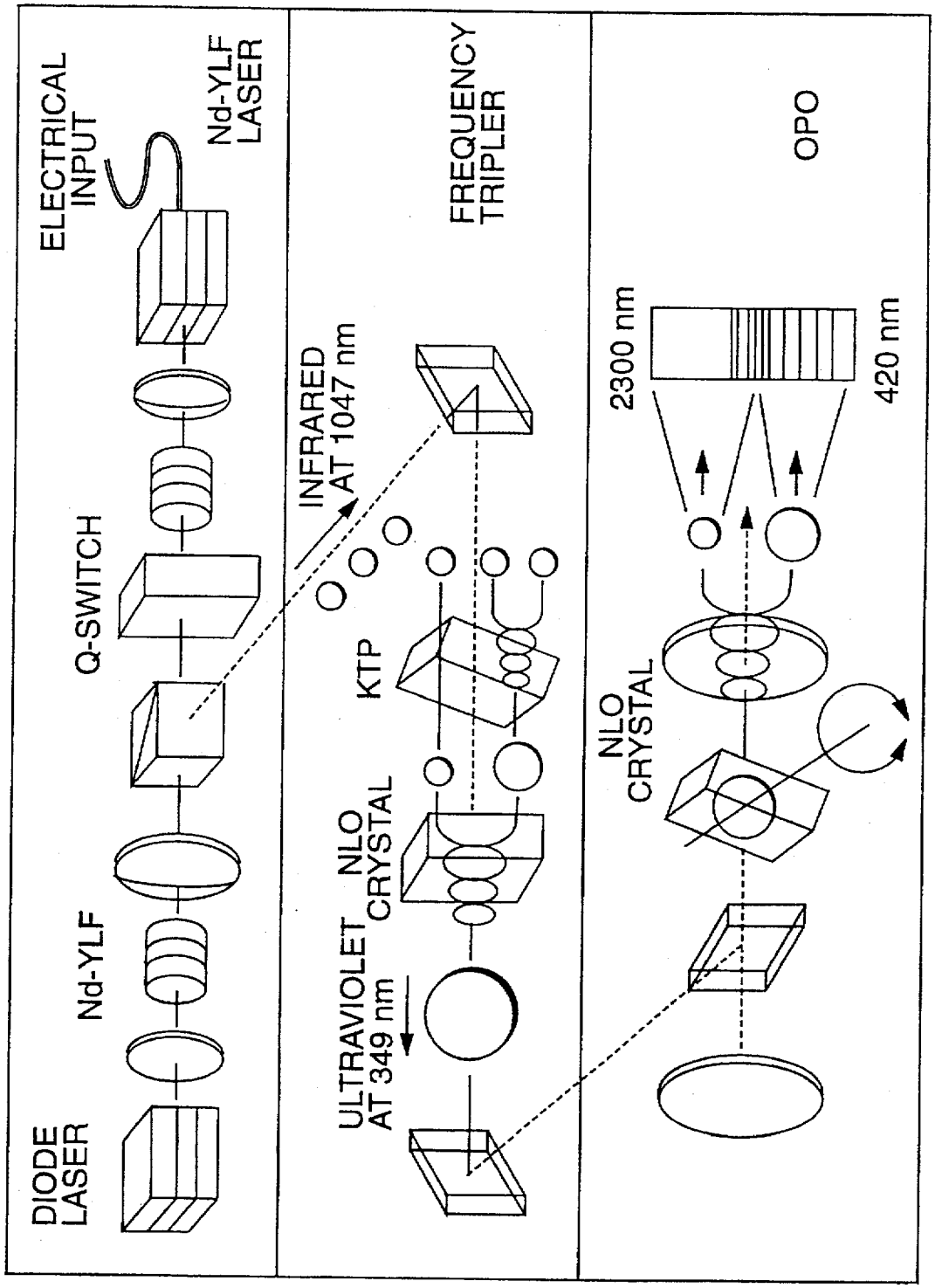
FIG. 2 is a schematic diagram illustrating an optical parametric oscillator that might use the nonlinear optical materials of the present invention.

Nonlinear optical materials can be used in a number of optical applications. For instance, the materials of the present invention can be used in a variety of devices that involve sum and difference frequency mixing, such as OPOs and parametric amplifiers. A schematic drawing of an OPO that utilizes a crystal of a nonlinear optical material is shown in FIG. 2. Optical parametric generation is a nonlinear optical process that uses a nonlinear optical crystal to split a photon emitted by a conventional laser into two new ones, termed signal and idler photons. The signal photon has the higher frequency. The sum of the two frequencies equals that of the pump laser. Phase-matching conditions within the nonlinear crystal determine the ratio of the frequencies. Changing the phase-matching conditions alters the splitting ratio, thereby simultaneously tuning the signal and idle outputs. This allows an OPO to produce widely tunable coherent light.

Thus, the present invention also concerns devices that use nonlinear optical materials. These devices take advantage of the fact that the wavelength of the light produced by the nonlinear optical material is some integer value times the light entering the material. Such devices would include a light source and a nonlinear optical material optically coupled to the light source. Lasers, such as a YAG:Nd laser, are examples of light sources likely to be used with such devices. "Optically coupled" means that the light emitted by the light source produces a polarization in the nonlinear optical material. This might simply mean that the output from the light source is focused on the nonlinear optical material. Alternatively, the device may include additional structural features, such as fiber optic cables and focusing lenses, so that the light emitted by the light source is transmitted efficiently to and focused on the nonlinear optical material. Moreover, the device may include additional components that are needed to perform a particular function, such as a mount for mounting crystals of the nonlinear optical material, and a photodetector for detecting light emitted by the light source and/or the nonlinear optical material.

Having illustrated and described the principles of the present invention in several preferred embodiments, it should be apparent to those skilled in the art that the invention can be modified in arrangement and detail without departing from such principles. I claim all modifications coming within the spirit and scope of the following claims.

I claim:

1. A nonlinear optical material according to the formula $$M_xM'_y(B_3O_5)_z$$

wherein M and M' are mono- or divalent metal ions, X varies from about 0.1 to about 1.9, Y varies from about 1.9 to about 0.1, and Z is 2 or 3.

2. The nonlinear optical material according to claim 1 wherein X=Y=1.

3. The nonlinear optical material according to claim 1 wherein X=Y=1, and Z=2.

4. The nonlinear optical material according to claim 1 wherein M and M' are independently selected from the group consisting of Group IA and IIA metals.

5. The nonlinear optical material according to claim 1 wherein M and M' are independently selected from the group consisting of cesium, lithium, barium, sodium and strontium.

6. The nonlinear optical material according to claim 1 wherein M and M' are independently selected from the group consisting of cesium and lithium.

7. The nonlinear optical material according to claim 1 wherein the material is selected from the group consisting of $CsLi(B_3O_5)_2$, $SrLi(B_3O_5)_3$, $BaNa(B_3O_5)_3$ and $BaLi(B_3O_5)_3$.

8. A nonlinear optical material according to claim 1 wherein the material is $CsLi(B_3O_5)_2$.

9. A nonlinear optical material according to the formula $$M_xM'_y(B_3O_5)_{x+y}$$

wherein M and M' are monovalent metal ions independently selected from the group consisting of Group IA metals, X varies from 0.1 to about 1.9, and wherein Y varies from about 1.9 to about 0.1.

10. The nonlinear optical material according to claim 9 wherein X=Y=1.

11. The nonlinear optical material according to claim 9 wherein M and M' are independently selected from the group consisting of cesium and lithium.

12. The nonlinear optical material according to claim 9 wherein the compound is $CsLiB_6O_{10}$.

13. A composition comprising a NLO material according to the formula $$M_xM'_y(B_3O_5)_z$$

wherein M and M' are mono- or divalent metal ions, X varies from 0.1 to about 1.9, Y varies from about 0.1 to about 1.9, and Z is 2 or 3.

14. The composition according to claim 13 wherein M and M' are independently selected from the group consisting of Group IA metals.

15. The composition according to claim 13 wherein M and M' are independently selected from the group consisting of cesium and lithium.

16. The composition according to claim 13 wherein the nonlinear optical material is selected from the group consisting of $CsLi(B_3O_5)_2$, $SrLi(B_3O_5)_3$, $BaNa(B_3O_5)_3$ and $BaLi(B_3O_5)_3$.

17. The composition according to claim 13 wherein the nonlinear optical material is $CsLi(B_3O_5)_2$.

18. A composition comprising a nonlinear optical material according to the formula $$M_xM'_y(B_3O_5)_{x+y}$$

wherein M and M' are monovalent metal ions independently selected from the group consisting of Group IA metals, X varies from 0.1 to about 1.9, and wherein Y varies from about 1.9 to about 0.1.

19. A method for making nonlinear optical materials according to the formula $$M_xM'_y(B_3O_5)_z$$

wherein M and M' are mono- or divalent metal ions, X varies from about 0.1 to about 1.9, Y varies from about 1.9 to about 0.1, and Z is 2 or 3, the method comprising:

forming a mixture comprising from about 10 to about 20 mole percent of a source of M, from about 10 to about 20 mole percent of a source of M', and from about 60 –80 mole percent of boron oxide; and heating the mixture to a temperature sufficient to form the nonlinear optical material.

20. The method according to claim 19 wherein M and M' are independently selected from the group consisting of Group IA and IIa metals.

21. The method according to claim 19 wherein M and M' are independently selected from the group consisting of cesium, lithium, barium, sodium and strontium.

22. The method according to claim 19 wherein M and M' are independently selected from the group consisting of cesium and lithium.

23. The method according to claim 19 wherein M is cesium, the source of M is cesium carbonate, M' is Li, and the source of M' is lithium nitrate.

24. The method according to claim 19 wherein the step of heating further comprises:

heating the mixture to a first temperature of at least 800 K;

cooling the mixture;

comminuting the mixture; and heating the mixture to a second temperature of at least 900 K.

25. A method for making $CsLiB_6O_{10}$, comprising:

forming a mixture comprising about 11 mole percent cesium carbonate, about 67 mole percent lithium nitrate and about 22 mole percent boron oxide; and heating the mixture to a temperature and for a period of time sufficient to form $CsLiB_6O_{10}$.

26. The method according to claim 25 wherein the step of heating further comprises:

heating the mixture to a first temperature of at least 800 K;

cooling the mixture;

comminuting the mixture; and heating the mixture to a second temperature of at least 900 K.

27. An optical device, comprising:

a laser; and a nonlinear optical material pumped by the laser to produce a second harmonic output, the optical material satisfying the formula $$M_X M'_Y (B_3 O_5)_Z$$

wherein M and M' are mono- or divalent metal ions, X varies from about 0.1 to about 1.9, Y varies from about 1.9 to about 0.1, and Z is 2 or 3.

28. The device according to claim 27 wherein the nonlinear optical material is selected from the group consisting of $CsLi(B_3O_5)_2$, $SrLi(B_3O_5)_3$, $BaNa(B_3O_5)_3$ and $BaLi(B_3O_5)_3$.

29. The device according to claim 27 wherein the nonlinear optical material is $CsLi(B_3O_5)_2$.

30. An optical parametric oscillator and amplifier, comprising:

a laser; and a nonlinear optical material satisfying the formula $$M_X M'_Y (B_3 O_5)_Z$$

Where M and M' are mono- or divalent metal ions, X varies from about 0.1 to about 1.9, Y varies from about 1.9 to about 0.1, and Z is 2 or 3, the nonlinear optical material being positioned in a cavity and pumped by the laser to produce sum and difference frequency mixing, the NLO material also being coupled to a tuner for selecting phase relationships between the pump, and signal and idler outputs, thereby producing an optical parametric oscillator and amplifier.

31. The device according to claim 30 wherein the nonlinear optical material is selected from the group consisting of $CsLi(B_3O_5)_2$, $SrLi(B_3O_5)_3$, $BaNa(B_3O_5)_3$ and $BaLi(B_3O_5)_3$.

32. The device according to claim 30 wherein the nonlinear optical material is $CsLi(B_3O_5)_2$.

* * * * *

Adverse Decision in Interference

Patent No. 5,684,813, Douglas A. Keszler, POLYBORATES USEFUL FOR OPTICAL FREQUENCY CONVERSION, Interference No. 104,577, final judgment adverse to the patentee rendered December 12, 2000, as to claims 1-26.

*(Official Gazette January 9, 2001)*